US012645168B2

(12) United States Patent
Obara et al.

(10) Patent No.: US 12,645,168 B2
(45) Date of Patent: Jun. 2, 2026

(54) IMAGE FORMING APPARATUS HAVING MULTI-BEAM LASER LIGHT EMITTING POINT PITCH IDENTIFICATION

(71) Applicant: CANON KABUSHIKI KAISHA, Tokyo (JP)

(72) Inventors: Mitsuhiro Obara, Shizuoka (JP); Tetsuya Nishiguchi, Kanagawa (JP); Hiroyuki Fukuhara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/828,912

(22) Filed: Sep. 9, 2024

(65) Prior Publication Data

US 2025/0138449 A1 May 1, 2025

(30) Foreign Application Priority Data

Oct. 26, 2023 (JP) ................................. 2023-183783

(51) Int. Cl.
 G03G 15/04 (2006.01)
 G02B 26/12 (2006.01)
 G03G 15/043 (2006.01)
(52) U.S. Cl.
 CPC ....... G03G 15/0435 (2013.01); G02B 26/123 (2013.01); G02B 26/127 (2013.01); G03G 2215/0404 (2013.01)
(58) Field of Classification Search
 USPC ......................................................... 399/51
 See application file for complete search history.

(56) References Cited

U.S. PATENT DOCUMENTS

| | | | |
|---|---|---|---|
| 2008/0144132 A1 | 6/2008 | Koga | ........................ H04N 1/04 |
| 2010/0033790 A1 | 2/2010 | Obara | .................... G02B 26/10 |
| 2011/0298884 A1* | 12/2011 | Furuta | .................. G02B 26/123 |
| | | | 347/224 |
| 2013/0120818 A1 | 5/2013 | Obara | .................... G02B 26/10 |
| 2014/0146374 A1 | 5/2014 | Obara | .................... G02B 26/12 |
| 2015/0338768 A1 | 11/2015 | Nagatoshi et al. | .. G03G 15/043 |
| 2016/0131896 A1 | 5/2016 | Nakamura et al. | .... G02B 26/08 |

(Continued)

FOREIGN PATENT DOCUMENTS

| | | |
|---|---|---|
| JP | 2001-108930 | 4/2001 |
| JP | 2008-152091 | 7/2008 |

(Continued)

*Primary Examiner* — Quana Grainger
(74) *Attorney, Agent, or Firm* — Venable LLP

(57) ABSTRACT

An image forming apparatus incudes a photosensitive member, a scanning optical unit and a control portion. The scanning optical unit is provided with a light source including a plurality of light emitting points and emitting laser lights form the plurality of light emitting points, respectively and a deflector deflecting each of the laser lights emitted from the plurality of light emitting points into a scanning direction. The scanning optical unit scans the photosensitive member with the plurality of laser lights deflected by the deflector and forms an electrostatic latent image on the photosensitive member. The control portion controls the scanning optical unit. Based on information regarding a light emitting point pitch as an interval between the plurality of light emitting points, the control portion identifies the light emitting point pitch.

13 Claims, 9 Drawing Sheets

(56)     References Cited

U.S. PATENT DOCUMENTS

| | | | |
|---|---|---|---|
| 2016/0171350 A1 | 6/2016 | Kobayashi et al. ... | G06K 15/12 |
| 2016/0363883 A1 | 12/2016 | Fukuhara ................. | B41J 2/385 |
| 2017/0090340 A1 | 3/2017 | Obara ..................... | B41J 2/385 |
| 2017/0142283 A1 | 5/2017 | Tanaka et al. ......... | H04N 1/113 |
| 2018/0113396 A1 | 4/2018 | Fukuhara ................. | B41J 2/385 |
| 2019/0265608 A1 | 8/2019 | Nishiguchi et al. ... | G03G 15/04 |
| 2022/0377198 A1 | 11/2022 | Obara et al. ............. | H04N 1/06 |
| 2024/0337965 A1 | 10/2024 | Yamano et al. ..... | G03G 15/043 |

FOREIGN PATENT DOCUMENTS

| | | |
|---|---|---|
| JP | 2015-141291 | 8/2015 |
| JP | 2015-189199 | 11/2015 |

* cited by examiner

IMAGE FORMING APPARATUS HAVING MULTI-BEAM LASER LIGHT EMITTING POINT PITCH IDENTIFICATION

FIELD OF THE INVENTION AND RELATED ART

The present invention relates to an image forming apparatus such as, for example, a laser beam printer (LBP) and a digital copy machine which forms an image on a recording material using electrophotographic recording technology.

A scanning optical device used in the image forming apparatus such as the laser beam printer and the digital copy machine includes a semiconductor laser element which emits laser lights corresponding to an image signal, a light deflector such as a rotational polygon mirror which deflects the laser lights, an imaging optical element having fθ characteristics, etc. And the scanning optical device forms an image of the laser lights in a spot shape on a photosensitive drum. Writing timings of the laser lights on the photosensitive drum are determined by an incidence timing of the laser lights into a horizontal synchronizing sensor. In addition, a configuration is employed in which, by correction of a laser light quantity in a main scanning direction, which is called as illuminance distribution correction, distribution of an electrostatic latent image on the photosensitive drum in the main scanning direction is made to be uniform, and uneven density of an images is reduced (see Japanese Patent Application Laid-Open No. 2008-152091).

In order to increase a number of output sheets per minute, some image forming apparatuses use a multi-beam laser element having a plurality of light emitting points on a laser chip inside the semiconductor laser element. By increasing a number of scanning lines which can be scanned at one time by the light deflector with the multi-beam laser element, a number of rotations of the optical deflector is kept low, resulting in realization of a low-noise and high-speed image forming apparatus. A semiconductor laser is a general-purpose electronic component and is often purchased from a laser element manufacturer. In one type of the image forming apparatus, there is a case in which the image forming apparatus is designed so that the semiconductor lasers from a plurality of the laser element manufacturers can be mounted thereto from a standpoint of stable supply of the component to be used and cost.

With respect to the multi-beam laser element, a light emitting point pitch, which is an interval between the light emitting points on the laser chip, is one of important characteristics. The light emitting point pitch, however, may differ among the laser element manufacturers. In the case in which the same image forming apparatus allows a use of the laser elements having different light emitting point pitches, the difference in the light emitting point pitches affects performance. When the semiconductor laser is pivotally moved about an optical axis of the laser lights in order to adjust a position of the image of the laser lights in a sub scanning direction on the photosensitive drum (upon adjusting a sub scanning pitch of the laser lights), if the light emitting point pitches differ, pivotal moving amounts thereof are to differ. If the pivotal moving amounts of the semiconductor lasers differ, a state of deflection, which is an oscillating direction of the laser lights, changes, and thus illuminance distribution of the scanning optical device changes. Therefore, upon performing the correction of the illuminance distribution as in the conventional example, correcting quantity of the laser light quantity to correct the illuminance distribution may change.

In addition, if the pivotal moving amounts of the semiconductor lasers differ, the interval in the main scanning direction of the positions of the images of each laser lights on the photosensitive drum also changes. Therefore, in the configuration in which the writing timing in the main scanning direction of each laser is corrected based on the timing at which one of the lasers of the multi-beam laser element enters the horizontal synchronizing sensor, a correcting amount of the writing timing of each laser may change. Therefore, if information on the light emitting point pitch is not known, appropriate correction cannot be performed, and uneven density may occur, or image defect such as moire due to a shift in the writing timing between the lasers may occur.

SUMMARY OF THE INVENTION

The present invention is conceived under such a situation, and an object of the present invention is to reduce occurrence of image defect by performing correction which is appropriate for mounted multi-beam laser elements even in a case in which multi-beam laser elements having different light emitting point pitches are mounted in a scanning optical device.

According to an aspect of the present invention, there is provided an image forming apparatus comprising: a photosensitive member; a scanning optical unit provided with a light source including a plurality of light emitting points and configured to emit laser lights form the plurality of light emitting points, respectively, and a deflector configured to deflect each of the laser lights emitted from the plurality of light emitting points into a scanning direction, the scanning optical unit scanning the photosensitive member with the plurality of laser lights deflected by the deflector and forming an electrostatic latent image on the photosensitive member; and a control portion configured to control the scanning optical unit, wherein, based on information regarding a light emitting point pitch which is an interval between the plurality of light emitting points, the control portion identifies the light emitting point pitch.

Further features of the present invention will become apparent from the following description of exemplary embodiments with reference to the attached drawings.

DESCRIPTION OF THE EMBODIMENTS

Embodiment

In the description below, a direction in which laser lights are scanned is referred to as a main scanning direction, and a rotational direction of a photosensitive drum, or in other words, a direction perpendicular to the main scanning direction, is referred to as a sub scanning direction. In addition, in a multi-beam laser element, which is a light source, an interval between positions of a plurality of light emitting points mounted on a laser chip is referred to as a light emitting point pitch.

(Image Forming Apparatus)

Figure 1:
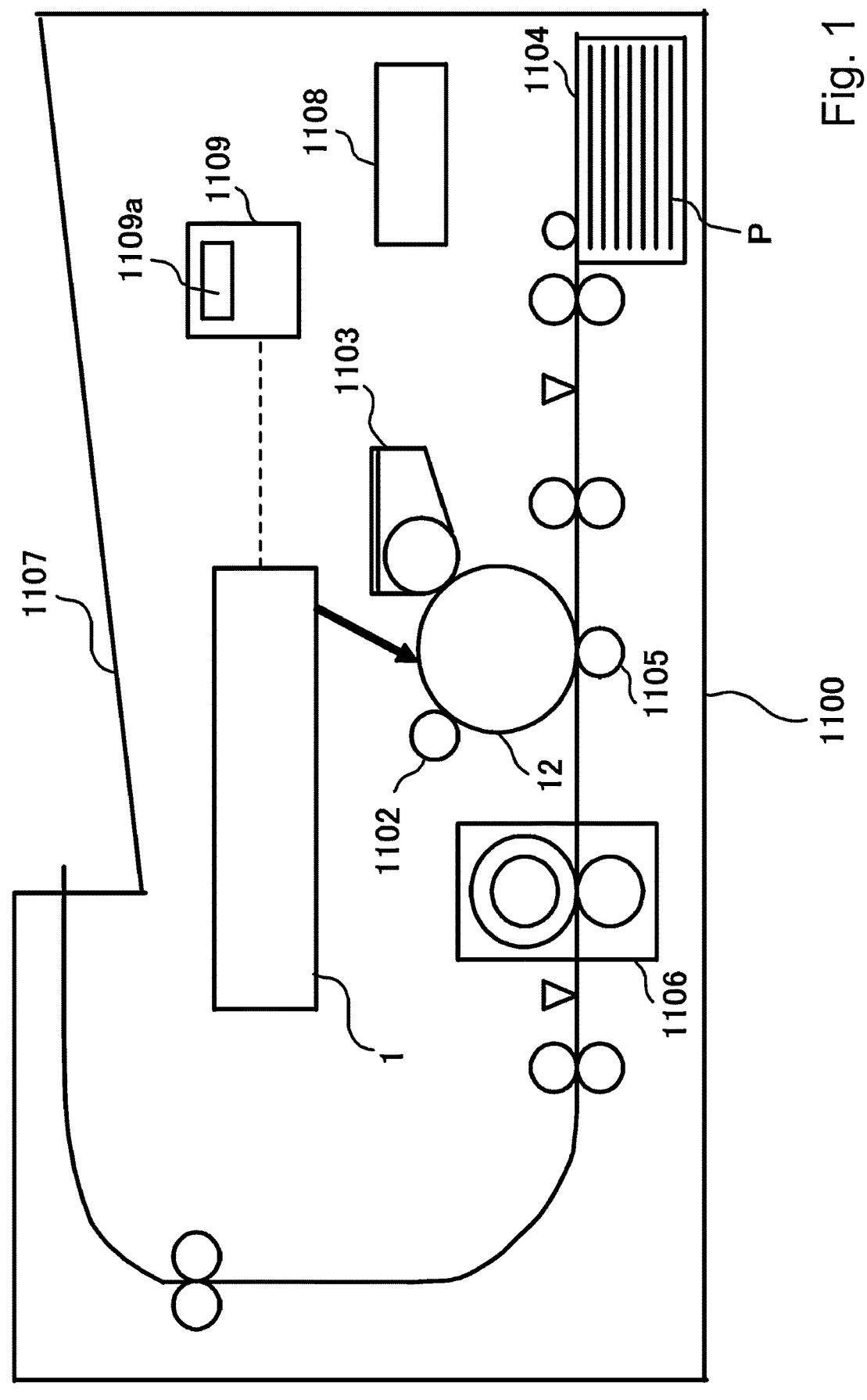
FIG. 1 is a schematic cross-sectional view of an image forming apparatus in an Embodiment.

In FIG. 1, an example of an outline configuration of an image forming apparatus is shown. A laser beam printer 1100 (hereinafter referred to as a printer 1100) is provided with a photosensitive drum 12, which is a photosensitive member, a charging portion 1102 and a developing portion 1103. The photosensitive drum 12 is an image bearing member on which a latent image (hereinafter referred to as an electrostatic latent image) is formed by a scanning optical device (scanning optical unit) 1. The charging portion 1102 uniformly charges the photosensitive drum 12. The developing portion 1103 forms a toner image by developing the electrostatic latent image formed on the photosensitive drum 12 with toner. The toner image formed on the photosensitive drum 12 (on the photosensitive member) is transferred by a transfer portion 1105 to a sheet P as a recording material fed from a cassette 1104, and the unfixed toner image transferred to the sheet P is fixed by a fixing unit 1106. The photosensitive drum 12, the charging portion 1102, the developing portion 1103 and the transfer portion 1105 are an image forming portion (image forming means). The fixed sheet P is discharged to a tray 1107. In addition, the printer 1100 is provided with a power supply device 1108, and supplies power from the power supply device 1108 to a driving portion such as a motor and to a control portion 1109. The control portion 1109 includes a CPU (not shown) and a memory 1109*a*, which is a memory means, and controls an operation of the scanning optical device 1, an image forming operation by the image forming portion, a conveyance operation of the sheet P, etc. Incidentally, the image forming apparatus to which the scanning optical device 1 of the present invention can be applied is not limited to the configuration exemplified in FIG. 1.

(Scanning Optical Device (Scanning Optical Unit))

Figure 2:
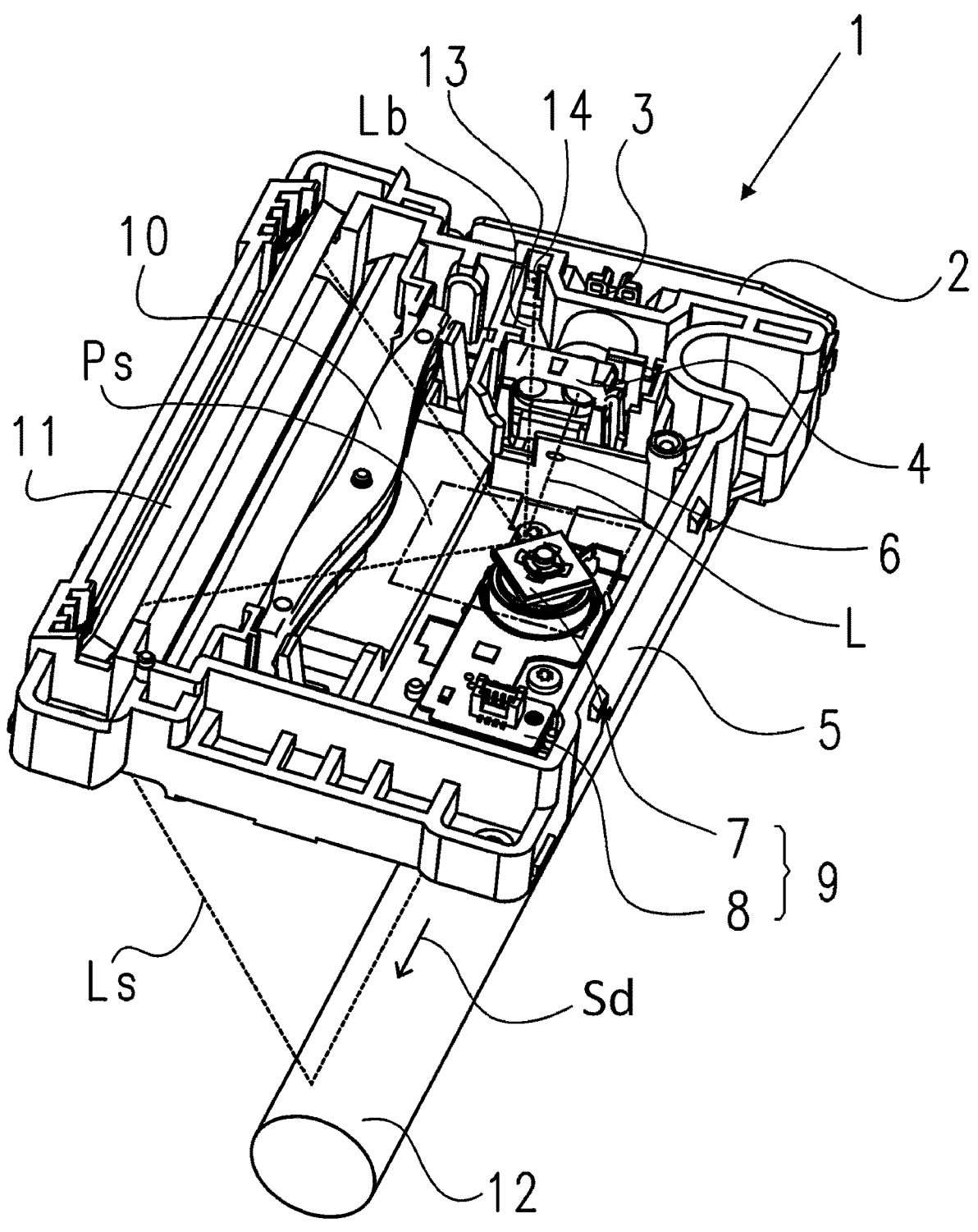
FIG. 2 is a perspective view of a scanning optical device in the Embodiment.

The scanning optical device in the present Embodiment will be described using FIG. 2. FIG. 2 is a perspective view of the scanning optical device 1 in the present Embodiment. Laser incident lights L emitted from a light source unit 3, which is driven and controlled by a circuit board 2, are made approximately to be parallel lights in the main scanning direction and are approximately condensed in the sub scanning direction by a BD anamorphic lens 4. Incidentally, the BD anamorphic lens 4 is a lens in which an anamorphic lens which directs the laser incident lights L to a rotational polygon mirror 7 and a lens which directs the laser lights Lb deflected by the rotational polygon mirror 7 to a horizontal synchronizing sensor 13 are integrated. The laser incident lights L passing through the BD anamorphic lens 4 are limited to a predetermined beam diameter by an optical aperture 6 formed in a housing 5, which is a casing, and is irradiated onto a reflecting surface of the rotational polygon mirror 7. The rotational polygon mirror 7 is rotationally driven by a drive circuit board 8 and deflects and scans the laser incident lights L which is incident thereon. In the present Embodiment, the rotational polygon mirror 7 includes four reflecting surfaces, however, a number of reflecting surfaces is not limited thereto. Here, the rotational polygon mirror 7 and the drive circuit board 8 constitute a light deflector 9 (deflector). The deflected laser incident lights L, as laser scanning lights Ls, passes through a fθ lens 10, is reflected by an elongated reflecting mirror 11, and is condensed on the photosensitive drum 12. Incidentally, a plane on which the rotational polygon mirror 7 scans the laser scanning lights Ls is defined as a scanning plane Ps.

In addition, the laser lights Lb, which is the laser incident lights L deflected by the rotational polygon mirror 7, pass through the BD anamorphic lens 4 and are condensed in the main scanning direction. The laser lights Lb, in a state of being condensed in the main scanning direction, are incident on the horizontal synchronizing sensor 13, as a detecting means, mounted on the circuit board 2, which determines a writing timing to the photosensitive drum 12 in the main scanning direction. Specifically, when the laser lights Lb passing through a BD slit 14 formed in the housing 5 is incident on the horizontal synchronizing sensor 13, an output of the horizontal synchronizing sensor 13 changes, and a timing of laser emission is controlled based on the timing of the output change as a reference.

With such an optical system, the scanning lights are directed onto the photosensitive drum 12 to perform an image recording. Specifically, by a rotation of the rotational polygon mirror 7, an angle at which the laser incident lights Ls are deflected is changed, and each spot image formed by the laser scanning lights Ls is scanned on a surface of the photosensitive drum 12 in a direction of an arrow Sd, which is an axial direction of the photosensitive drum 12. In addition, as the photosensitive drum 12 is rotated, each spot image is moved in a direction perpendicular to the axial direction of the photosensitive drum 12 (sub scanning direction). By this, the electrostatic latent image is formed. In addition, an opening of the housing 5 is covered by an unshown cover.

(Structure of the Semiconductor Laser and Mounting on the Optical Scanning Device)

Figure 3A:
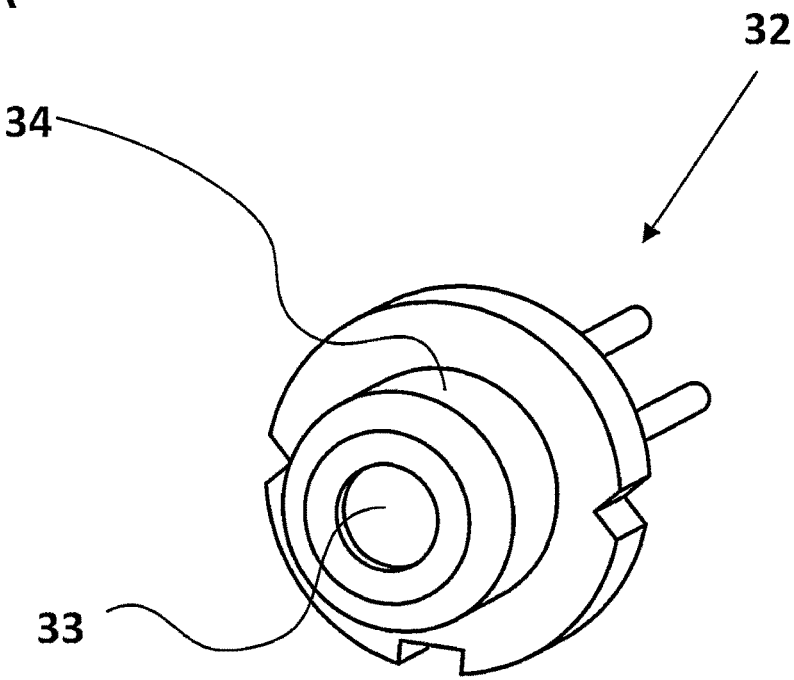
FIG. 3A is a perspective view illustrating an appearance of a first semiconductor laser in the Embodiment.

Next, the semiconductor laser 32 (first semiconductor laser) having a first light emitting point pitch (first interval) used in the light source unit 3 will be described. FIG. 3A is a perspective view illustrating the semiconductor laser 32, and inside the semiconductor laser 32, components such as a laser chip inside are included. From a viewpoint of dust proof, the semiconductor laser 32 of CAN type is sealed by a cap 34 having a cap glass 33 which allows the laser lights to transmit.

Figure 3B:
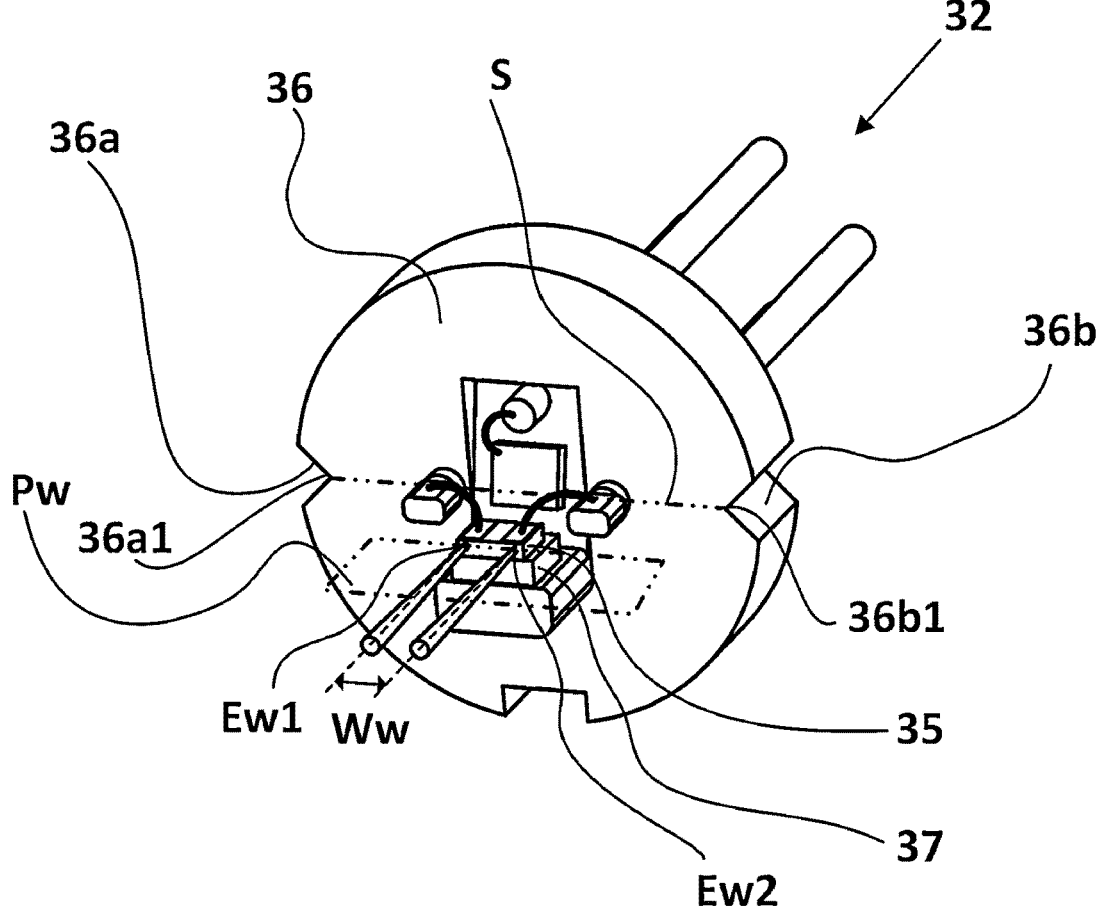
FIG. 3B is a perspective view illustrating an internal structure of the first semiconductor laser in the Embodiment.

In FIG. 3B, a perspective view illustrating the semiconductor laser 32 in a state in which the cap 34 is excluded for description is shown. In the semiconductor laser 32, a laser chip 35 is bonded to a metal stem 36 via a submount 37 made of silicon, etc. The laser chip 35 emits the lights when an electric current is applied thereto by being electrically connected to the stem 36. In the present Embodiment, the semiconductor laser 32 is a two-beam laser having two light emitting points of a light emitting point Ew1 (first light emitting point) and a light emitting point Ew2 (second light emitting point), and the laser chip 35 emits laser beams from the two light emitting points Ew1 and Ew2 disposed on an end surface.

The light emitting points Ew1 and Ew2 are arranged approximately parallel to a bonded surface between the laser chip 35 and the submount 37, and the light emitting point pitch is indicated by Ww (hereinafter referred to as a pitch Ww.). That is, the first light emitting point pitch is the pitch Ww. Here, a plane which is approximately parallel to the bonded surface between the laser chip 35 and the submount 37 and passes through the light emitting points Ew1 and Ew2 is defined as a light emission plane Pw. In addition, in the stem 36, the laser chip 35 is mounted so that a stem reference axis S connecting a notch 36a and a notch 36b in the stem 36 is approximately parallel to the light emission plane Pw. Incidentally, more specifically, the notch 36a and the notch 36b have portions 36a1 and 36b1 cut into an inside of the stem 36, respectively, and the stem reference axis S is also an axis connecting the portion 36a1 and the portion 36b1.

Figure 4:
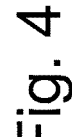
FIG. 4 is an enlarged view illustrating the first semiconductor laser mounted on the scanning optical device in the Embodiment.

FIG. 4 shows an enlarged view illustrating a vicinity of the light source unit 3 in the scanning optical device 1. Incidentally, FIG. 4 illustrates a state in which the circuit board 2 is removed for description. The light source unit 3 includes the semiconductor laser 32 and a holder member 31 into which the semiconductor laser 32 is press-fitted. In a case in which the two-beam laser is used, the light source unit 3 is fixed to the housing 5 after rotational adjustment about an emitting light axis is performed since it is necessary to form the spot image at a distanced position in the sub scanning direction on the photosensitive drum 12. In other words, the semiconductor laser 32 is held by the holder member 31 in a state in which the light emission plane Pw of the semiconductor laser 32 is tilted to the scanning plane Ps, which is the plane scanned by the rotational polygon mirror 7.

Incidentally, an angle θw between the light emission plane Pw and the scanning plane Ps is obtained from θ expressed by the following equation (1).

[Equation 1]

$$\theta = \tan^{-1}\{(25.4 \div dpi \times 1000) \div \beta \div W\} \qquad (1)$$

dpi: image resolution,

β: optical sub scanning magification of the optical scanning device,

W: light emitting point pitch

For example, if the resolution is 600 dpi, the light emitting point pitch Ww of the laser is 90 µm, and the optical sub scanning magnification β of the optical scanning device 1 is 5 times, then the semiconductor laser 32 is tilted and mounted so that the angle θw between the light emission plane Pw and the scanning plane Ps is 5.4°.

(Semiconductor Lasers Having Different Light Emitting Point Pitches)

Figure 5A:
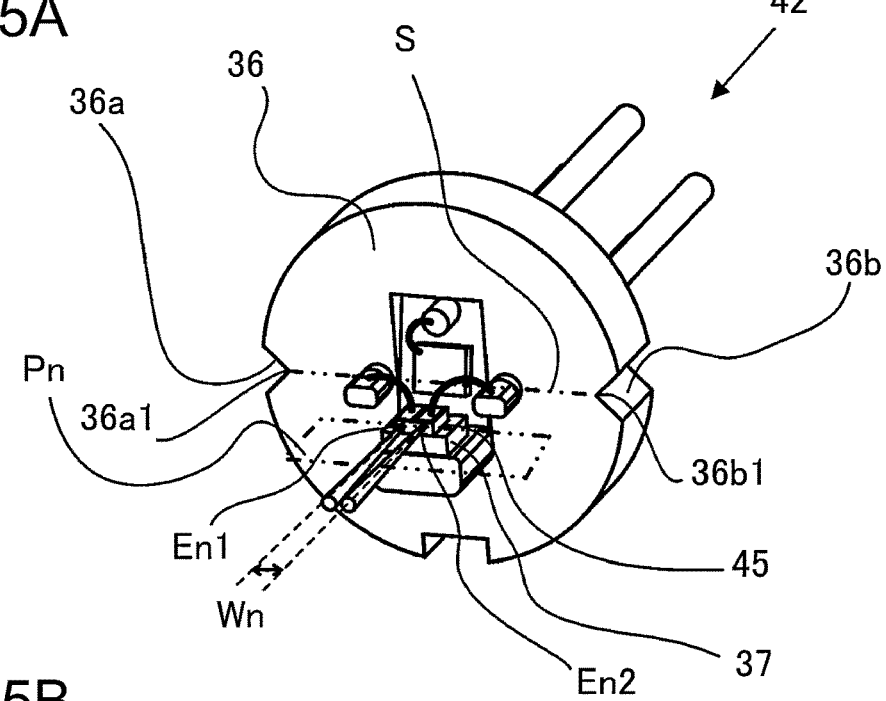
FIG. 5A is a perspective view illustrating an internal structure of a second semiconductor laser in the Embodiment.

In FIG. 5A, a semiconductor laser 42 (second semiconductor laser) having a second light emitting point pitch (second interval), of which the light emitting point pitch is different from the semiconductor laser 32 is shown. The components common to the semiconductor laser 32 and common definitions are indicated by the same reference numerals. As in FIG. 3B, the description is given in the state in which the cap 34 is removed. The laser chip 45 emits laser beams from two light emitting points of a light emitting point En1 (first light emitting point) and a light emitting point En2 (second light emitting point) disposed on an end surface.

The light emitting points En1 and En2 are arranged approximately parallel to a bonded surface between the laser chip 45 and the submount 37, and a light emitting point pitch is indicated by Wn (hereinafter referred to as a pitch Wn.). That is, the second light emitting point pitch is the pitch Wn. Here, a plane which is approximately parallel to the bonded surface between the laser chip 45 and the submount 37 and passes through the light emitting points En1 and En2 is defined as a light emission plane Pn. In addition, in the stem 36, the laser chip 45 is mounted so that the stem reference axis S connecting the notch 36a and the notch 36b in the stem 36 is approximately parallel to the light emission plane Pn. Incidentally, the stem reference axis S is also an axis connecting the portion 36a1 and the portion 36b1.

Comparing the semiconductor laser 32 having the first light emitting point pitch and the semiconductor laser 42 having the second light emitting point pitch, the light emitting point pitches are Ww>Wn, and the semiconductor laser 32 has a wider light emitting point pitch than the semiconductor laser 42. In other words, the semiconductor laser 32 is a "wide pitch laser" having a wider light emitting point pitch, and the semiconductor laser 42 is a "narrow pitch laser" having a narrower light emitting point pitch.

In general, the narrow pitch laser is more efficient to manufacture since a size of the laser chip can be reduced and more laser chips can be taken from a single silicon wafer. However, the narrower the light emitting point pitch, the more susceptible the laser is to effect of heat upon neighboring light emitting points emitting lights, and since degree of susceptibility depends on a structure of the laser, design freedom for the light emitting point pitch interval varies for each laser element.

Figure 5B:
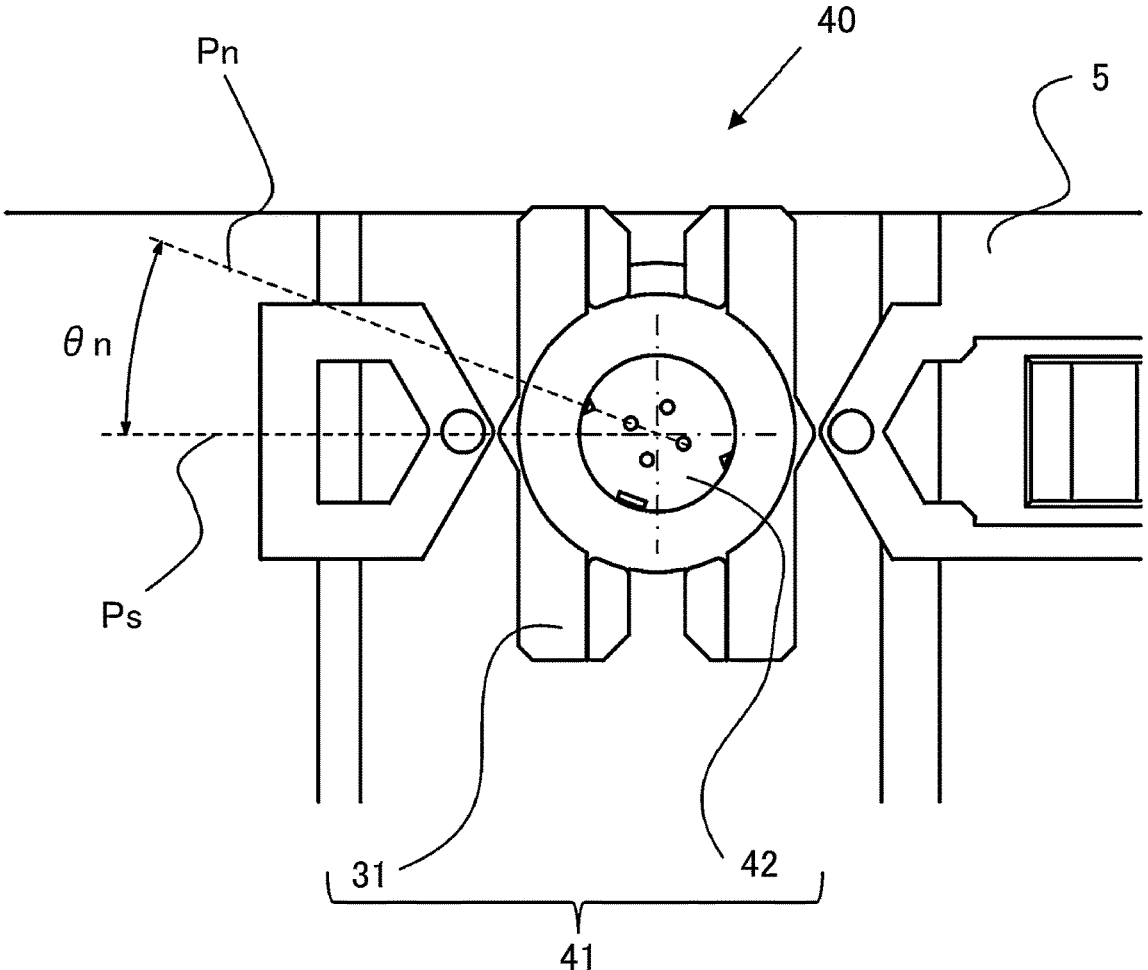
FIG. 5B is an enlarged view illustrating the second semiconductor laser mounted on the scanning optical device in the Embodiment.

Next, a state when the semiconductor laser 42, which is the narrow pitch laser, is mounted on a scanning optical device 40 will be described. In FIG. 5B, an enlarged view of a vicinity of a light source unit 41 in the scanning optical device 40 is shown. Incidentally, as in FIG. 4, FIG. 5B illustrates a state in which the circuit board 2 is removed for description. Since the scanning optical device 40 has a configuration in which, in the scanning optical device 1, the light source unit 3 is changed to the light source unit 41 and other configurations are the same, description of each configuration other than the light source unit 41 will be omitted. The components common to the scanning optical device 1 and common definitions are indicated by the same reference numerals.

The light source unit 41 includes the semiconductor laser 42 and the holder member 31 into which the semiconductor laser 42 is press-fitted. As in the light source unit 3, the light emission plane Pn of the semiconductor laser 42 is tilted with respect to the scanning plane Ps, which is the plane scanned by the rotational polygon mirror 7. Incidentally, an angle θn between the light emission plane Pn and the scanning plane Ps is obtained from θ expressed in the equation (1) above. For example, if the resolution is 600 dpi, the light emitting point pitch Wn of the laser is 30 µm, and the sub scanning magnification of the scanning optical device 40 is 5 times, the semiconductor laser 42 is tilted and mounted so that the angle θn between the light emission plane Pn and the scanning plane Ps is 15.8°. Thus, the angle θn at which the semiconductor laser 42 having the narrower light emitting point pitch is tilted is larger than the angle θw at which the semiconductor laser 32 having the wider light emitting point pitch is tilted (θn>θw).

As described above, the angles θw and θn between the light emission planes Pw and Pn and the scanning plane Ps are different for the semiconductor laser 32, which is the wide pitch laser, and the semiconductor laser 42, which is the narrow pitch laser, when the common optical system is used. In addition, when a common control is executed in the scanning optical device 1 and the scanning optical device 40, on which the respective semiconductor lasers 32 and 42 are mounted, performance of the scanning optical device is also affected. Specifically, the effects are on the illuminance distribution of the optical scanning device and the writing timing for each laser, and will be described in the following.

(Effects on the Illuminance Distribution of the Scanning Optical Device)

The lights of the semiconductor laser are oscillating in a direction approximately parallel to the light emission planes Pw and Pn described above. On the other hand, the rotational polygon mirror 7 and the reflecting mirror 11, which reflect the laser lights, generally have different reflectance for a P-polarized light, which is a light oscillating in an incident surface of rays, and for a S-polarized light, which is a light oscillating in a direction perpendicular to the incident surface of the rays. Therefore, as mentioned above, between the scanning optical device 1 and the scanning optical device 40, the angles θw and θn between the scanning plane Ps and the light emission planes Pw and Pn, which are the oscillating directions of the laser lights, are different, and proportions of the P-polarized component and the S-polarized component of the laser lights on the rotational polygon mirror 7 and the reflecting mirror 11 are also different. As a result, the illuminance distribution, which is distribution of the laser light quantity in the main scanning direction (light quantity distribution) in the scanning optical device, is also different.

Figure 6:
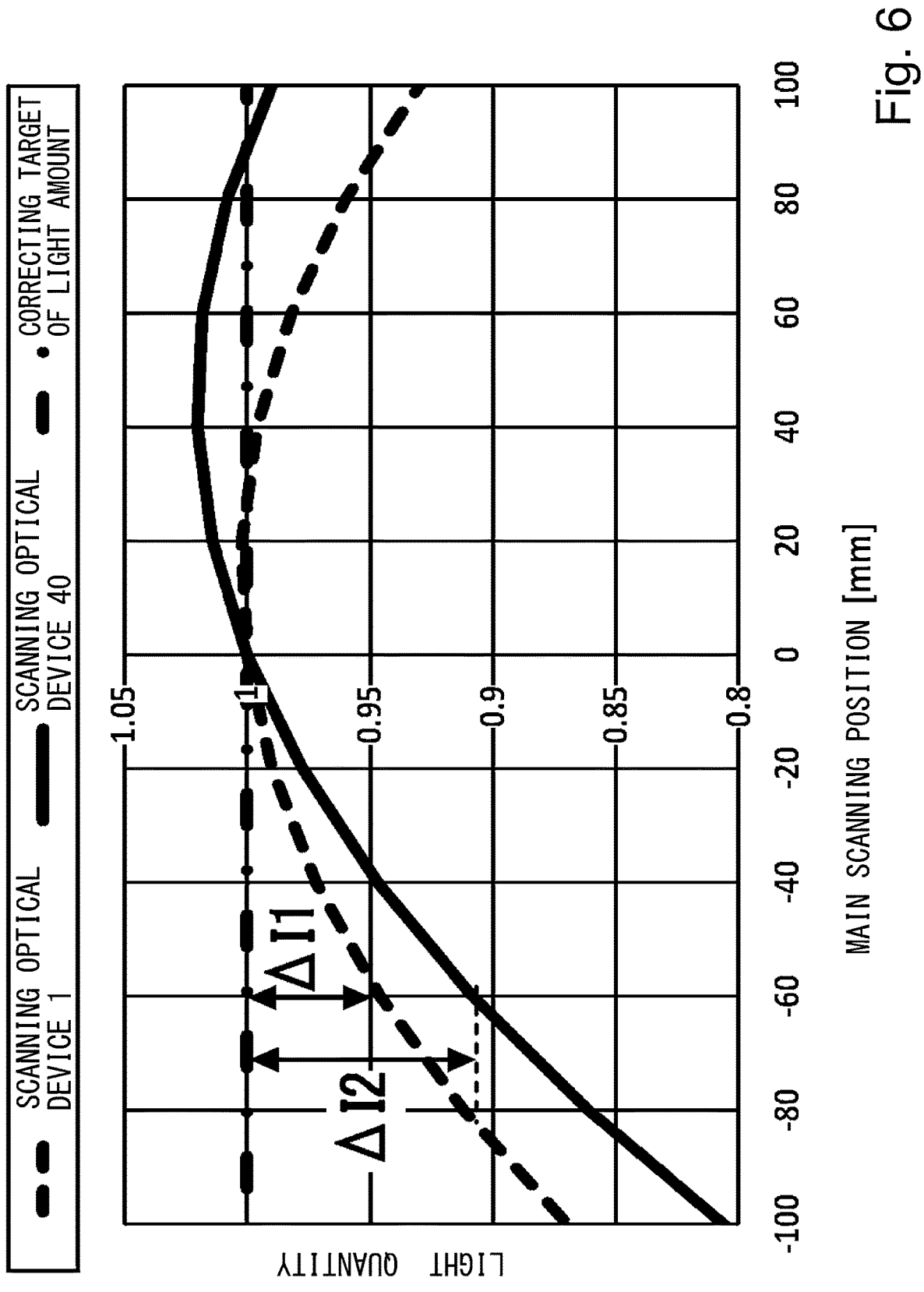
FIG. 6 is a view illustrating a difference in illuminance distribution due to light emitting point pitches in the Embodiments.

In FIG. 6, an example of a graph of the illuminance distribution of the scanning optical device 1 and the scanning optical device 40 is shown. A horizontal axis of the graph represents a main scanning position [mm] with reference to a central position of the sheet P, a vertical axis thereof represents the light quantity of the scanning optical devices 1 and 40, and the light quantity is normalized by the light quantity at the central position in the main scanning direction of the sheet P and the light quantity at the central position is defined as 1. A broken line represents the illuminance distribution of the scanning optical device 1 on which the semiconductor laser 32 is mounted, and a solid line represents the illuminance distribution of the scanning optical device 40 on which the semiconductor laser 42 is mounted. In the graph, a target value upon correcting the light quantity (light quantity correction target) is shown as a dash-dotted line. The target value is set so that the illuminance distribution is uniform regardless of the main scanning position [mm], as shown in FIG. 6. For example, the target value is set so that the light quantities at positions other than the central position are the same quantity as the light quantity at the central position.

As shown in the graph, in a case in which the illuminance distribution is not uniform in the main scanning position, since it may lead to the uneven density on the image, the illuminance distribution correction may be performed to make the light quantity distribution uniform by changing (correcting) the laser light quantity in the main scanning direction. Specifically, the control portion 1109 corrects the light quantity in the main scanning direction by using differences between the target value for the light quantity correction shown in FIG. 6 (dash-dotted line) and the illuminance distribution of the scanning optical devices 1 and 40 as the correcting values, respectively.

For example, at the main scanning position −60 mm, the correcting quantity of the light quantity is ΔI1 for the scanning optical device 1 and ΔI2 for the scanning optical device 40. Thus, between the case in which the scanning optical device 1 is mounted and the case in which the scanning optical device 40 is mounted, an appropriate correcting quantity is different (ΔI1≠ΔI2). Incidentally, the control portion 1109 functions as a first correcting means to correct the illuminance distribution in the scanning direction.

Incidentally, the illuminance distribution varies depending on configurations of the rotational polygon mirror 7 and a reflecting film of the reflecting mirror 11, and in addition, in a case in which the fθ lens 10 is made of resin, the illuminance distribution varies depending on phenomenon known as birefringence, in which the refractive index varies depending on the oscillating direction of the light due to an effect from orientation of the resin. Therefore, the illuminance distribution is not limited to the distribution exemplified in FIG. 6.

(Effects on the Writing Timings for Each Laser)

Upon a rotational control of the optical scanning device, the control portion 1109 determines the writing timing based on the timing when the laser lights enter the horizontal synchronizing sensor 13 as a reference, as described above. Here, in a case in which there are a plurality of the light emitting points, as in the case of the two-beam laser, there is a configuration in which the writing timings of each laser are determined based on a timing at which one of the laser lights is incident on the horizontal synchronizing sensor 13 as a reference in order to determine the writing timings of each laser during image formation. Hereinafter, the configuration in which the writing timings of each laser are determined based on the timing when one of the laser lights is incident on the horizontal synchronizing sensor 13 as the reference is referred to as a 1BD configuration. In addition, there is also a configuration in which the writing timings of each laser are determined based on a timing at which each laser is incident on the horizontally synchronizing sensor 13 as a reference, and the configuration is hereinafter referred to as an nBD configuration.

FIG. 7 illustrates timing charts illustrating output timing of the horizontal synchronizing sensor 13 and light emitting timings of the lasers to form the image at desired positions on the photosensitive drum 12 for each of an LD1 and an LD2, when two beams of the two-beam laser are defined as the LD1 and the LD2. Incidentally, the two beams of the two-beam laser are beams emitted, in the semiconductor laser 32, from the light emitting point Ew1 and the light emitting point Ew2, respectively, and in the semiconductor laser 42, from the light emitting point En1 and the light emitting point En2, respectively.

Figure 7A:
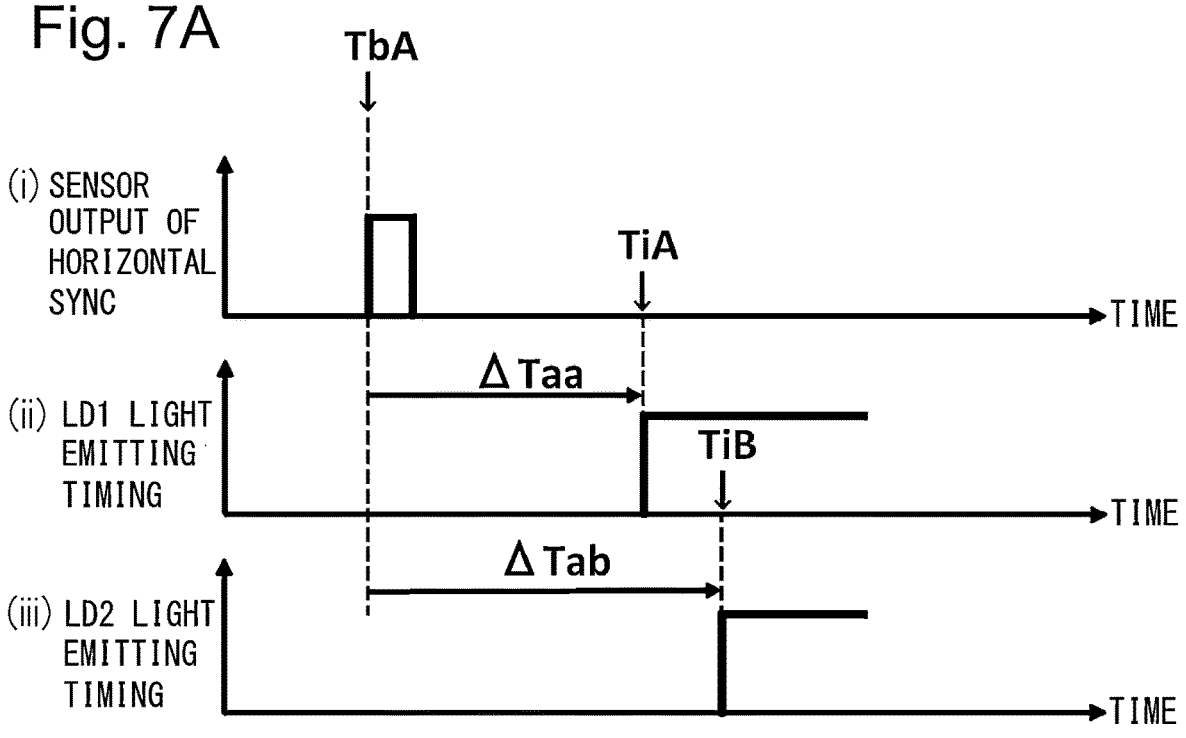
FIG. 7A is a timing chart describing writing timings of each laser in the Embodiment.
Figure 7B:
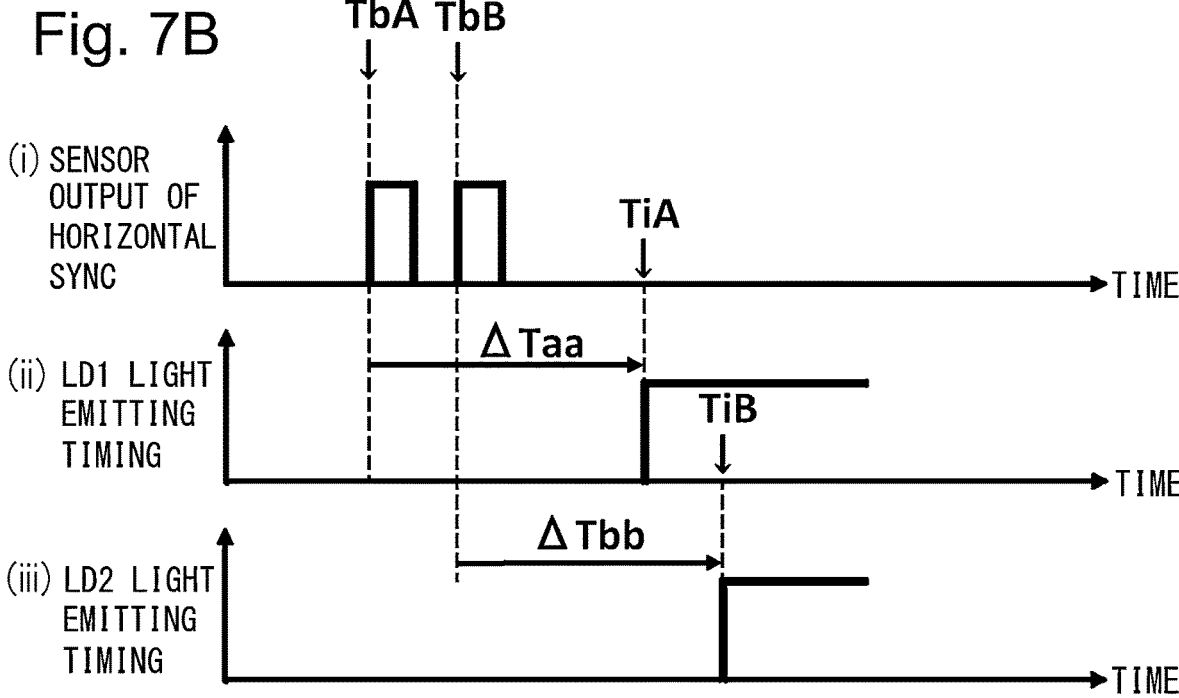
FIG. 7B is a timing chart describing the writing timings of each laser in the Embodiment.

FIG. 7A illustrates a timing chart for the 1BD configuration and FIG. 7B illustrates a timing chart for the nBD configuration. In both cases, (i) illustrates a signal output from the horizontal synchronizing sensor 13 (high level or low level). (ii) illustrates the light emitting timing of the LD1 and (iii) illustrates the light emitting timing of the LD2. All horizontal axes represent time.

A timing when the light of the LD1 is detected by the horizontal synchronizing sensor 13 is defined as TbA, and a timing when the light of the LD2 is detected by the horizontal synchronizing sensor 13 is defined as TbB. In addition, a timing at which the LD1 emits the light and a timing at which the LD2 emits the light to form the image at the desired positions on the photosensitive drum 12 are defined as TiA and TiB, respectively. The light emitting timing of the LD1 is the same for both the 1BD configuration and the nBD configuration, and the control portion 1109 causes the LD1 to be emitted at the timing TiA, which is ΔTaa later with reference to the timing TbA.

On the other hand, the timing TiB at which the LD2 is emitted differs between the 1BD configuration and the nBD configuration. In the case of the 1BD configuration in FIG. 7A, the control portion 1109 causes the LD2 to be emitted at the timing TiB, which is ΔTab later with reference to the timing TbA. On the other hand, in the nBD configuration of FIG. 7B, the control portion 1109 causes LD2 to be emitted at the timing TiB, which is ΔTbb later with reference to the timing TbB, to form the image at the desired position. In other words, in the nBD configuration, the same laser as the laser which emits the laser lights for the image formation is used as a reference of the timing at which the horizontal synchronizing sensor 13 detects.

In both the 1BD configuration and the nBD configuration, the rotational control is possible, however, in the nBD configuration, the rays of each beam are incident on positions away from each other in the sub scanning direction in the BD slit 14. Therefore, it is highly susceptible to straightness of the BD slit 14, mold burrs, adhesion of dust or fuzz to the BD slit 14, etc. Specifically, only a detecting timing of one of the lasers at the horizontal synchronizing sensor 13 may be shifted and the writing timing of the image may be shifted. In such a case, since a laser interval in the main scanning direction is shifted, image defect such as moire may occur. On the other hand, in the 1BD configuration, even if there are the aforementioned effects on the BD slit 14, since degrees of the effects on all lasers are the same, only the writing timing of one of the lasers is shifted but the shift of the laser interval in the main scanning direction can be avoided. Conversely, it is in the case of the 1BD configuration that there are effects from the lasers having different light emitting point pitches.

The ΔTab shown in FIG. 7A is a value which varies greatly depending on the light emitting point pitch. For example, if the resolution is 600 dpi and the main scanning magnification of the scanning optical device is 5 times, between an optimal ΔTab in a case of the light emitting point pitch of the laser being 30 μm and an optimal ΔTab in a case of the light emitting point pitch being 90 μm, there is a difference equivalent to 300 μm on the photosensitive drum 12. As such, appropriate correcting amounts for the writing timings of each laser differ between the case in which the scanning optical scanning device 1 is mounted and the case in which the scanning optical device 40 is mounted. The control portion 1109 functions as a second correcting means for correcting the writing timing of the laser.

(Identification of the Light Emitting Point Pitch)

As described above, in the case in which the lasers having different light emitting point pitches are used, the correcting amounts for correcting the illuminance distribution and the writing timings for each laser are different from each other. Therefore, since the optimal correcting amount cannot be selected without knowing information on the light emitting point pitch of the laser element mounted on the scanning optical device, an identifying means to identify the light emitting point pitch is provided in the present Embodiment. Specifically, the control portion 1109 identifies the light emitting point pitch from a difference in the timing, i.e., time difference, between the LD1 and the LD2 detected by the horizontal synchronizing sensor 13. The control portion 1109 functions as the identifying means.

Figure 8A:
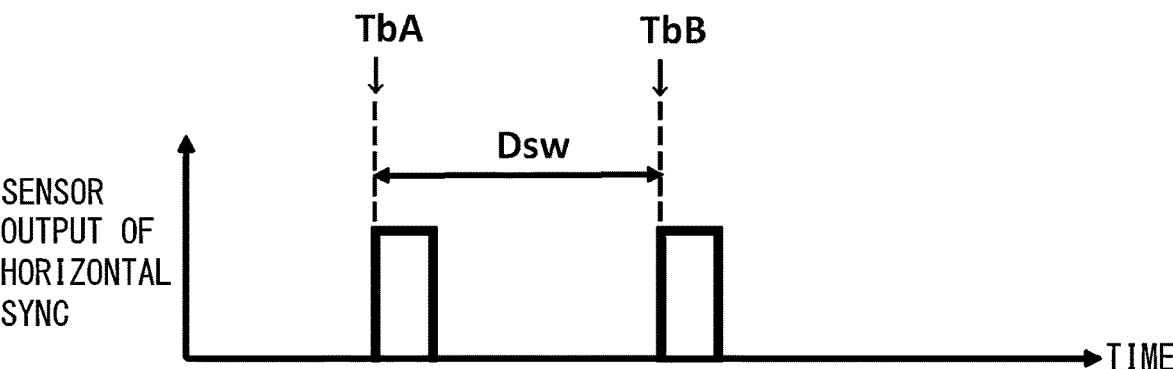
FIG. 8A is a timing chart describing an identifying method for the light emitting point pitch in the Embodiment.
Figure 8B:
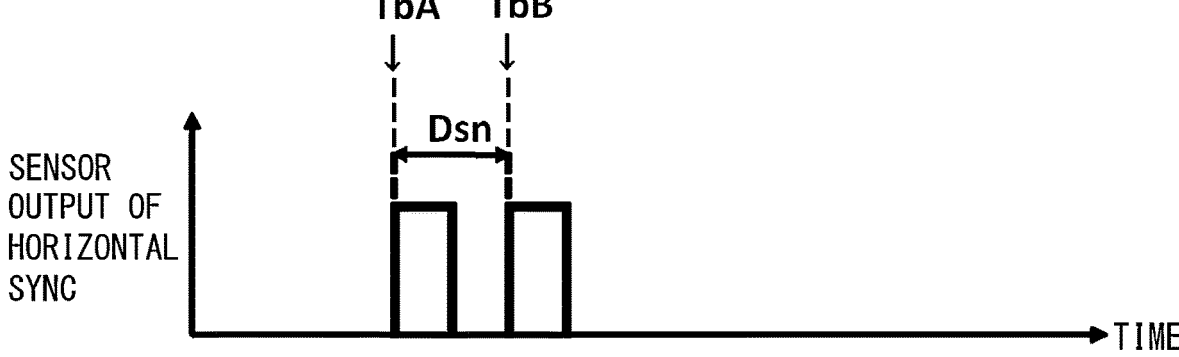
FIG. 8B is a timing chart describing the identifying method for the light emitting point pitch in the Embodiment.

In FIG. 8A, detection signals (high level or low level) on the horizontal synchronizing sensor 13 in the case in which the scanning optical scanning device 1 having the wide pitch laser (semiconductor laser 32) is used is shown. In FIG. 8B, detection signals on the horizontal synchronizing sensor 13 in the case in which the scanning optical device 40 having the narrow pitch laser (semiconductor laser 42) is used is shown. Both horizontal axes represent time.

In the case of using the scanning optical device 1, the time difference between a timing TbA (first timing) when the LD1 is detected by the horizontal synchronizing sensor 13 and a timing TbB (second timing) when the LD2 is detected is defined as a time difference Dsw. In addition, in the case of using the scanning optical device 40, the time difference between the timing TbA when the LD1 is detected by the horizontal synchronizing sensor 13 and the timing TbB when the LD2 is detected is defined as a time difference Dsn. Comparing the time difference Dsw with the time difference Dsn, it is Dsw>Dsn, and the wider the light emitting point pitch, the longer the time difference. As such, by examining the time difference between the timing TbA and the timing TbB, the control portion 1109 identifies the light emitting point pitch.

In other words, the time difference corresponds to the information on the light emitting point pitch. Specifically, the time differences between the timing TbA and the timing TbB for each light emitting point pitches are stored in the memory 1109a provided to the control portion 1109, and are compared to an actual measurement result to identify the light emitting point pitch. In the memory 1109a, the information may be stored as a table, for example, associating the semiconductor lasers having different light emitting point pitches and respective time differences thereof.

(Timing to Identify the Light Emitting Point Pitch)

As described above, in the case of the nBD configuration, since the output of each laser is detected by the horizontal synchronizing sensor 13, the identifying method for the light emitting point pitch by the control portion 1109 can be used during the image formation. However, in the case of the 1BD configuration, only the output of one of the laser lights is detected on the horizontal synchronizing sensor 13 during the image formation. Therefore, in the case of the 1BD configuration, if the output of each laser light is detected by the horizontal synchronizing sensor 13 at a timing other than during the image formation, such as when the scanning optical device is started before the image formation, or immediately after turning power of the image forming apparatus ON, the identifying method for the light emitting point pitch in the present Embodiment can be applied. Incidentally, even in the nBD configuration, the light emitting point pitch may be identified at a timing other than during image formation.

By this identifying method, the light emitting point pitch of the semiconductor laser mounted on the scanning optical device is identified by the control portion 1109 on the printer 1100. The control portion 1109, according to the results, selects the correcting amounts appropriate for the light emitting point pitches from the correcting quantities for the illuminance distribution correction for each light emitting point pitch and the correcting amounts for the writing timings for each laser, which are stored in the control portion 1109, and instructs the scanning optical scanning device.

Incidentally, in the present Embodiment, the two-beam laser as a multi-beam laser is used for the description, however, it is not limited thereto but the aforementioned issues are common to multi-beam lasers, and multi-beam lasers having two beams or more may be used.

(Modified Example)

Figure 9:
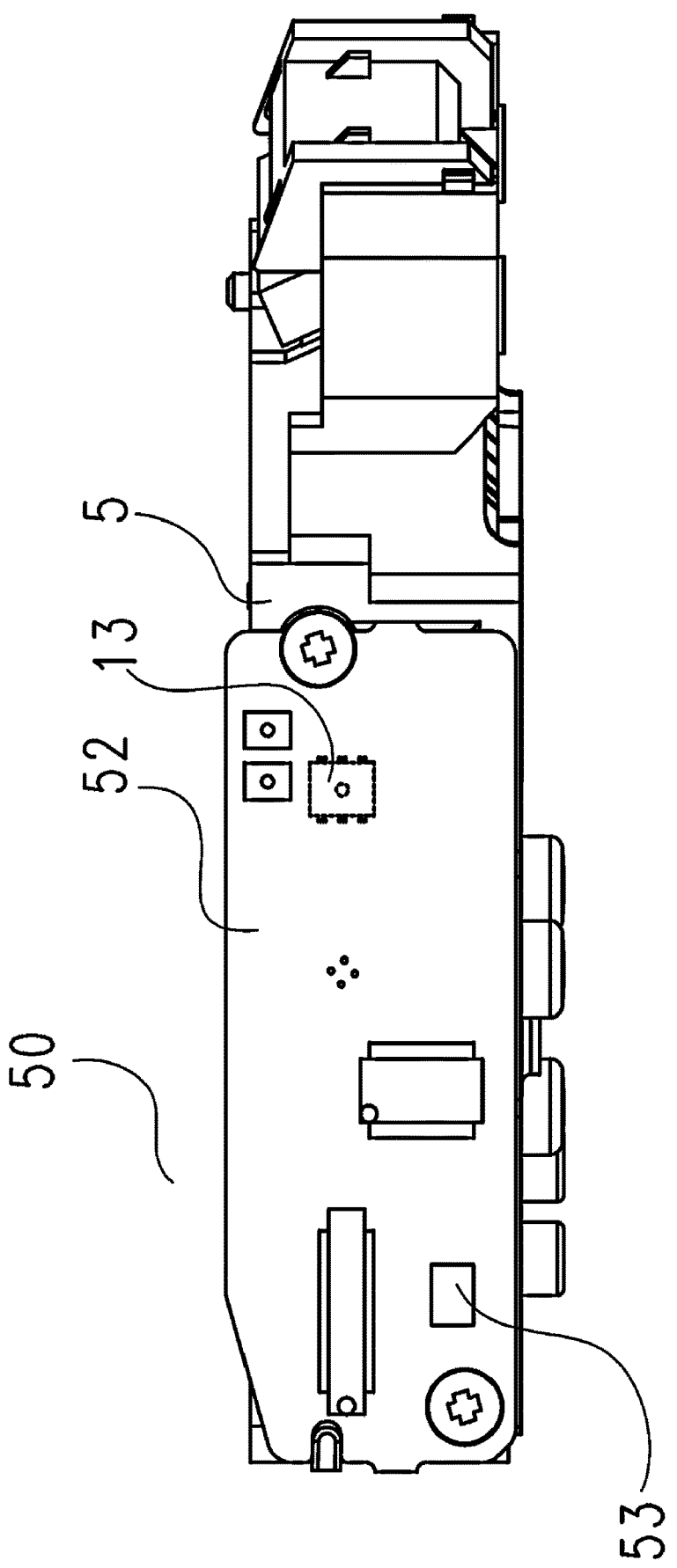
FIG. 9 is an explanatory view illustrating a circuit board in a scanning optical device in a Modified Example.

Next, a Modified Example of the present Embodiment will be described with focusing on differences from the Embodiment described above. In FIG. 9, an enlarged view of a vicinity of a circuit board 52 of a scanning optical device 50 in the Modified Example is shown. Since the scanning optical device 50 has the configuration in which, with respect to the scanning optical device 1, the circuit board 2 is changed to the circuit board 52 and other configurations are the same as in the Embodiment, the description of each configuration other than the circuit board 52 will be omitted. The components common to the scanning optical device 1 and common definitions are indicated by the same reference numerals.

On the circuit board 52, a memory (storage) member 53 is provided. The memory member 53 is a nonvolatile memory and stores the information on the light emitting point pitches at a time of manufacture of the scanning optical device 50. In other words, the memory member 53 provided on the circuit board 52, rather than the memory 1109*a* described above, stores the information on the light emitting point pitches. The control portion 1109 identifies the light emitting point pitch of the semiconductor laser by reading the information on the light emitting point pitches stored in the memory member 53, and sets the correcting quantities for the illuminance distribution correction and the correcting amounts for the writing timings to values appropriate for the semiconductor laser.

As the information on the light emitting point pitches does not have to be the information on the light emitting point pitches (information on intervals) itself, but can be any information which can be related to the information on the light emitting point pitches, such as layer information of manufacturers of the laser elements.

In addition, in the Modified Example, the nonvolatile memory is used as the memory means, however, the memory means is not limited thereto. For example, the memory means may be a barcode label. If the barcode label is read when the scanning optical device is assembled into the image forming apparatus, the control portion 1109 can relate the information on the light emitting point pitches to the image forming apparatus based on the information read from the barcode label.

As described above, according to the Modified Example, by sending the information on the light emitting point pitches from the scanning optical device to the control portion of the image forming apparatus, the light emitting point pitch of the semiconductor laser can be identified. Then, based on the identified information on the light emitting point pitch, the control portion instructs the scanning optical device the optimum correcting amounts for the illuminance distribution correction, the writing timing correction, etc. By this, even in a case in which the semiconductor lasers having different light emitting point pitches are used, it becomes possible to provide the image forming apparatus experiencing fewer image defect such as uneven density and moire.

As described above, according to the present Embodiment, even in the case in which the multi-beam laser elements having different light emitting point pitches are mounted on the scanning optical device, the occurrence of image defect can be reduced by performing the correction appropriate for the mounted multi-beam laser element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-183783 filed on Oct. 26, 2023, which is hereby incorporated by reference herein in its entirety.

What is claimed is:

1. An image forming apparatus comprising:
a photosensitive member;
a scanning optical unit provided with a light source including a laser chip on which a plurality of light emitting points are disposed and configured to emit laser lights from the plurality of light emitting points, respectively, and a deflector configured to deflect each of the laser lights emitted from the plurality of light emitting points into a scanning direction, the scanning optical unit scanning the photosensitive member with the plurality of laser lights deflected by the deflector and forming an electrostatic latent image on the photosensitive member;
a memory means configured to store reference information regarding a light emitting point pitch that is an interval between the plurality of light emitting points on the laser chip, and
a control portion configured to control the scanning optical unit, the control portion is configured to obtain measurement information regarding the light emitting point pitch, to compare the measurement information with the reference information, and to identify the light emitting point pitch based on a result of the comparison.

2. The image forming apparatus according to claim 1, wherein the scanning optical unit includes detecting means configured to detect the laser lights deflected by the deflector,
wherein when the plurality of light emitting points are defined as a first light emitting point and a second light emitting point, the measurement information regarding the light emitting point pitch is a time difference between a first timing when the laser light emitted from the first light emitting point is detected by the detecting means and a second timing when the laser light emitted from the second light emitting point is detected by the detecting means, and
wherein the control portion identifies the light emitting point pitch based on the time difference.

3. The image forming apparatus according to claim 2, wherein the time difference becomes longer as the light emitting point pitch is wider.

4. The image forming apparatus according to claim 1, further comprising first correcting means configured to correct a light quantity distribution of the laser light in the scanning direction,
wherein the first correcting means acquires a correcting value for correcting the light quantity distribution based on the light emitting point pitch identified by the control portion and corrects the light quantity distribution by the correcting value.

5. The image forming apparatus according to claim 2, further comprising second correcting means configured to correct a writing timing of the laser light emitted from each of the plurality of light emitting points as a correcting value which is a time from the timing when the laser light emitted from one light emitting point of the plurality of light emitting points is detected by the detecting means, and wherein the second correcting means acquires the correcting value based on the light emitting point pitch identified by the control portion and corrects the writing timing by the correcting value.

6. The image forming apparatus according to claim 5, wherein the control portion identifies the light emitting point pitch at a timing other than during image formation.

7. An image forming apparatus comprising:

a photosensitive member;

a scanning optical unit provided with a light source including a laser chip on which a plurality of light emitting points are disposed and configured to emit laser lights from the plurality of light emitting points, respectively, and a deflector configured to deflect each of the laser lights emitted from the plurality of light emitting points into a scanning direction, the scanning optical unit scanning the photosensitive member with the plurality of laser lights deflected by the deflector and forming an electrostatic latent image on the photosensitive member; and a memory configured to store reference information regarding a light emitting point pitch which is an interval between the plurality of light emitting points on the laser chip; and a controller configured to control the scanning optical unit, wherein the controller is configured to obtain measurement information regarding the light emitting point pitch, to compare the measurement information with the reference information, and to identify the light emitting point pitch based on a result of the comparison.

8. The image forming apparatus according to claim 7, wherein the scanning optical unit further includes a detector configured to detect the laser lights deflected by the deflector, wherein when the plurality of light emitting points are defined as a first light emitting point and a second light emitting point, the measurement information regarding the light emitting point pitch is a time difference between a first timing at which the laser light emitted from the first light emitting point is detected by the detector and a second timing at which the laser light emitted from the second light emitting point is detected by the detector, and wherein the controller identifies the light emitting point pitch based on the time difference.

9. The image forming apparatus according to claim 8, wherein the time difference becomes longer as the light emitting point pitch is wider.

10. The image forming apparatus according to claim 7, wherein the controller is further configured to correct a light quantity distribution of the laser light in the scanning direction, and wherein the controller acquires a correcting value for correcting the light quantity distribution based on the light emitting point pitch identified by the controller and corrects the light quantity distribution by the correcting value.

11. The image forming apparatus according to claim 8, wherein the controller is configured to correct a writing timing of the laser light emitted from each of the plurality of light emitting points as a correcting value which is a time from the timing when the laser light emitted from one light emitting point of the plurality of light emitting points is detected by the detector, and wherein the controller acquires the correcting value based on the light emitting point pitch identified by the controller and corrects the writing timing by the correcting value.

12. The image forming apparatus according to claim 11, wherein the controller identifies the light emitting point pitch at a timing other than during image formation.

13. The image forming apparatus according to claim 7, wherein the laser chip has only two light emitting points.

* * * * *